US012785228B2

(12) United States Patent
Li

(10) Patent No.: US 12,785,228 B2
(45) Date of Patent: Nov. 3, 2026

(54) RIVETED BATTERY COVER

(71) Applicant: Shenzhen Kedali Industry Co., Ltd., Guangdong (CN)

(72) Inventor: Jianju Li, Guangdong (CN)

(73) Assignee: Shenzhen Kedali Industry Co., Ltd., Guangdong (CN)

(*) Notice: Subject to any disclaimer, the term of this patent is extended or adjusted under 35 U.S.C. 154(b) by 799 days.

(21) Appl. No.: 17/907,909

(22) PCT Filed: Sep. 17, 2021

(86) PCT No.: PCT/CN2021/118965
§ 371 (c)(1),
(2) Date: Aug. 29, 2022

(87) PCT Pub. No.: WO2022/227376
PCT Pub. Date: Nov. 3, 2022

(65) Prior Publication Data

US 2024/0195030 A1 Jun. 13, 2024

(30) Foreign Application Priority Data

Apr. 29, 2021 (CN) ........................ 202120910449.7

(51) Int. Cl.
*H01M 50/567* (2021.01)
*H01M 50/15* (2021.01)
(Continued)

(52) U.S. Cl.
CPC ......... *H01M 50/567* (2021.01); *H01M 50/15* (2021.01); *H01M 50/188* (2021.01); *H01M 50/566* (2021.01)

(58) Field of Classification Search
CPC .. H01M 50/567; H01M 50/15; H01M 50/188; H01M 50/566; H01M 50/147; H01M 50/172; H01M 50/561; Y02E 60/10
See application file for complete search history.

(56) References Cited

U.S. PATENT DOCUMENTS

2015/0140415 A1* 5/2015 Harayama ........... H01M 50/176 429/179
2015/0147636 A1* 5/2015 Kim .................... H01M 50/531 429/179
(Continued)

FOREIGN PATENT DOCUMENTS

CN 107195810 A 9/2017
CN 207183330 U * 4/2018
(Continued)

OTHER PUBLICATIONS

English translation of CN-207183330-U (Year: 2018).*
(Continued)

*Primary Examiner* — Ula C Ruddock
*Assistant Examiner* — Sarika Gupta
(74) *Attorney, Agent, or Firm* — Wood Phillips Katz Clark & Mortimer

(57) ABSTRACT

Provided is a riveted battery cover which relates to the technical field of battery cover assembly. The riveted battery cover includes a terminal and includes a riveting block, an upper plastic insulator, a top cover, and a bottom insulator which are successively stacked. A first step hole and a second step hole are coaxially disposed in the riveting block. A stamped end of the terminal successively passes through the bottom insulator, the top cover, the upper plastic insulator, the first step hole, and the second step hole. A part of the stamped end of the terminal protruding from the first step hole is stamped to form a protrusion located in the second step hole.

12 Claims, 3 Drawing Sheets

(51) Int. Cl.
*H01M 50/188* (2021.01)
*H01M 50/566* (2021.01)

(56) References Cited

U.S. PATENT DOCUMENTS

| | | | | |
|---|---|---|---|---|
| 2015/0228958 | A1* | 8/2015 | Jang | H01M 50/533 429/179 |
| 2018/0183018 | A1* | 6/2018 | Maeda | H01M 50/55 |
| 2018/0233716 | A1* | 8/2018 | Chen | H01M 10/02 |

FOREIGN PATENT DOCUMENTS

| | | | |
|---|---|---|---|
| CN | 207719341 | U | 8/2018 |
| CN | 207896133 | U | 9/2018 |
| CN | 110148686 | A | 8/2019 |
| CN | 111246664 | A | 6/2020 |
| CN | 111276664 | A | 6/2020 |
| CN | 212810417 | U | 3/2021 |

OTHER PUBLICATIONS

Office Action for the corresponding Swedish Patent Application No. 2251007-7 mailed May 1, 2024.

International Search Report for corresponding PCT Application No. PCT/CN2021/118965 mailed Jan. 26, 2022.

* cited by examiner

RIVETED BATTERY COVER

CROSS-REFERENCE TO RELATED APPLICATIONS

This is a National Stage Application filed under 35 U.S.C. 371 based on International Patent Application No. PCT/CN2021/118965, filed on Sep. 17, 2021, which claims priority to Chinese Patent Application No. 202120910449.7 filed on Apr. 29, 2021, the disclosures of both of which are incorporated herein by reference in their entireties.

TECHNICAL FIELD

The present application relates to the technical field of battery cover assembly and, for example, to a riveted battery cover.

BACKGROUND

At present, a power battery top cover includes a riveting block, an upper plastic insulator, a top cover, a terminal, and a bottom insulator. An installation hole is provided on the top cover and a central hole is provided on the riveting block. During installation, the upper plastic insulator is first placed in the installation hole: next, an end of the terminal successively passes through the bottom insulator, the top cover and the upper plastic insulator and is riveted in the central hole of the riveting block: then laser welding is adopted at the riveting position of the terminal and the riveting block: and finally, the bottom insulator is securely connected to the top cover by ultrasonic welding. Since the terminal is securely connected to the riveting block by extrusion, the stability and reliability of this kind of connection method are all relatively poor.

SUMMARY

Embodiments of the present application is to provide a riveted battery cover having the advantages of high connection strength and good reliability.

Embodiments of the present application provides a riveted battery cover which includes a terminal and includes a riveting block, an upper plastic insulator, a top cover, and a bottom insulator which are successively stacked. A first step hole and a second step hole are coaxially disposed in the riveting block and a diameter of the second step hole is larger than a diameter of the first step hole. A stamped end of the terminal successively passes through the bottom insulator, the top cover, the upper plastic insulator, the first step hole, and the second step hole. A part of the stamped end of the terminal protruding from the first step hole is stamped to form a protrusion and the protrusion is located in the second step hole.

BRIEF DESCRIPTION OF DRAWINGS

The drawings used in description of the embodiments of the present application are briefly described below.

REFERENCE LIST

Figure 1:
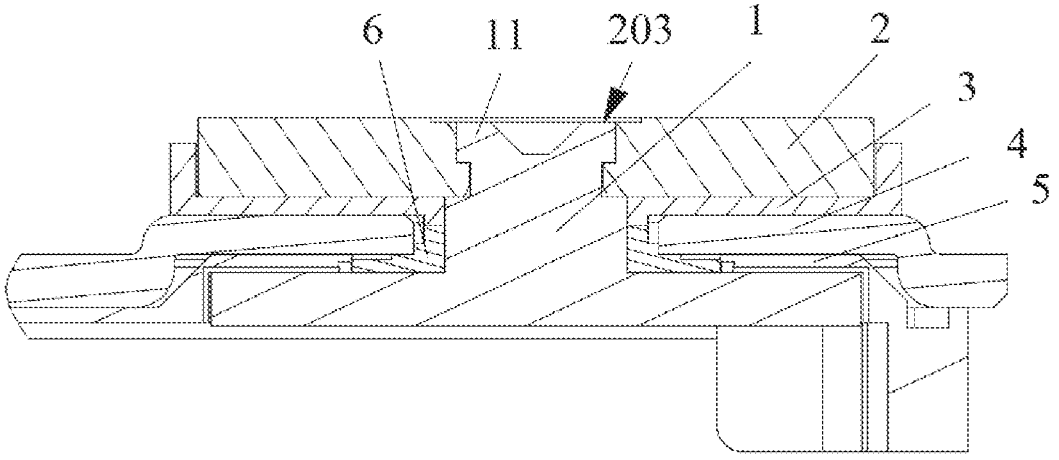
FIG. 1 is a partial sectional view of a riveted battery cover after being stamped according to an embodiment of the present application.

1 terminal
10 step
11 protrusion
2 riveting block
201 first step hole
202 second step hole
203 counterbore
3 upper plastic insulator
301 second connecting hole
302 placing groove
31 ring-shaped protrusion
4 top cover
40 first connecting hole
5 bottom insulator
50 third connecting hole
6 sealing member
61 sealing gasket
62 sealing ring

DETAILED DESCRIPTION

The present application will be described below with reference to the accompanying drawings and embodiments.

In the description of the embodiments of the present application, it is to be noted that the orientations or position relations indicated by terms such as “center”, “upper”, “lower”, “left”, “right”, “vertical”, “horizontal”, “inside”, “outside” and the like are based on orientations or position relations shown in the drawings. These orientations or position relations are intended merely to facilitate and simplify the description of the present application, and not to indicate or imply that a device or element referred to must have such specific orientations or must be configured or operated in such specific orientations. In addition, terms such as “first” and “second” are used merely for the purpose of description and are not to be construed as indicating or implying relative importance. The terms “first position” and “second position” are two different positions.

In the description of the present application, unless otherwise expressly specified and limited, the term “installation”, “connected to each other”, or “connected” is to be construed in a broad sense, for example, as securely connected or detachably connected: mechanically connected or electrically connected: directly connected to each other or indirectly connected to each other via an intermediary: or internally connected between two elements. For those of ordinary skill in the art, specific meanings of the preceding terms in the present application may be understood based on specific situations.

Figure 2:
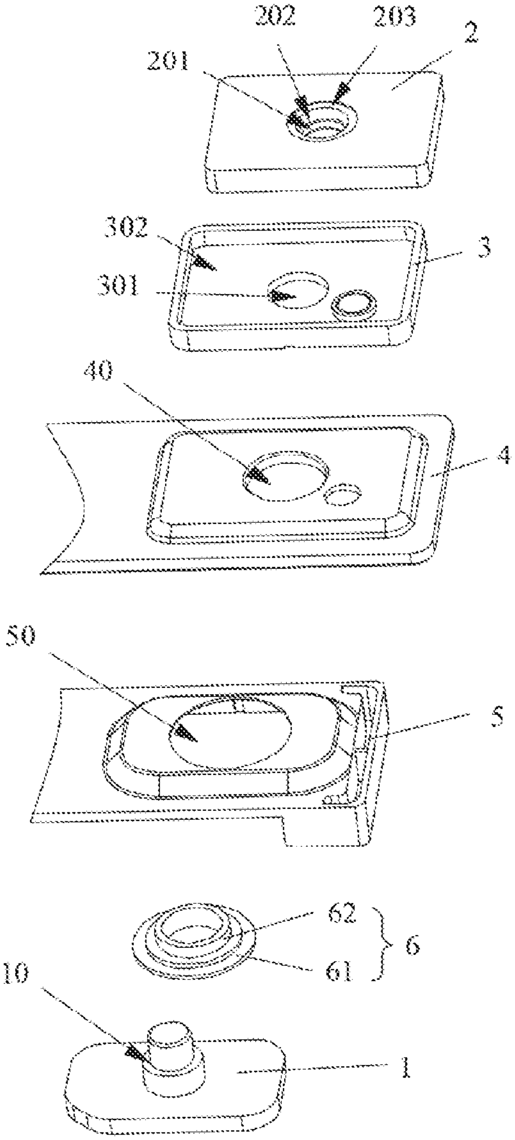
FIG. 2 is a partial structure view of a disassembled riveted battery cover before being stamped according to an embodiment of the present application.
Figure 3:
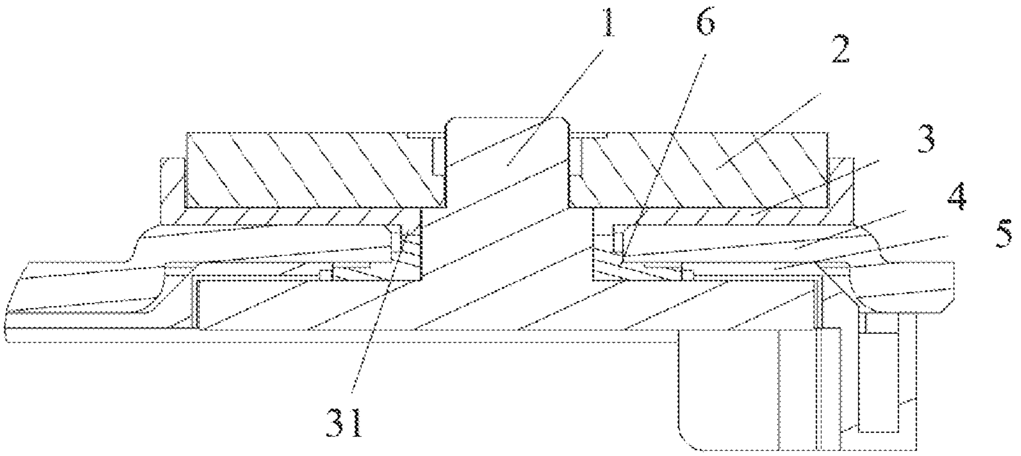
FIG. 3 is a partial sectional view of a riveted battery cover before being stamped according to an embodiment of the present application.

This embodiment provides a riveted battery cover. As shown in FIGS. 1 to 3, the riveted battery cover includes a terminal 1 and includes a riveting block 2, an upper plastic insulator 3, a top cover 4, and a bottom insulator 5 which are successively stacked. A first step hole 201 and a second step hole 202 are coaxially disposed in the riveting block 2 which is a riveted aluminum block. A diameter of the second step hole 202 is larger than a diameter of the first step hole 201. A stamped end of the terminal 1 successively passes through the bottom insulator 5, the top cover 4, the upper plastic insulator 3, the first step hole 201, and the second step hole 202. A part of the stamped end of the terminal 1 protruding from the first step hole 201 is stamped to form a protrusion 11 located in the second step hole 202.

According to a riveted battery cover provided by this embodiment, the riveting block 2 is additionally provided with the second step hole 202 having a diameter larger than the diameter of the first step hole 201, and the part of the stamped end of the terminal 1 protruding from the first step hole 201 is stamped to form the protrusion 11 located in the second step hole 202 during installation so that the terminal 1 and the riveting block 2 are securely connected to each other. Thus, connecting strength and reliability of the riveted battery cover are increased.

In this embodiment, the protrusion 11 is welded on the riveting block 2 by laser welding to increase the strength of connection between the terminal 1 and the riveting block 2 and an upper end of the terminal 1 is recessed on the riveting block 2 to avoid a welding-caused uneven surface of the riveting block 2, reducing the probability of causing cold joints between the protrusion 11 and the riveting block 2, decreasing the probability of aging peeling at the welding point between the terminal 1 and the riveting block 2, and ensuring the strength of connection between the terminal 1 and the riveting block 2.

As shown in FIGS. 1 to 3, in this embodiment, a sealing member 6 is sleeved on the terminal 1 and clamped between the top cover 4 and a securing end of the terminal 1. For example, as shown in FIG. 2, the sealing member 6 is sleeved on the terminal 1 and the sealing member 6 includes a sealing gasket 61 and a sealing ring 62: a lower-end surface of the sealing gasket 61 and an inner wall of the sealing ring 62 are each attached to the terminal 1: an upper-end surface of the sealing gasket 61 is attached to the top cover 4: and a top of the sealing ring 62 abuts the upper plastic insulator 3. The sealing member 6 can not only enable the top cover 4, the terminal 1 and the upper plastic insulator 3 to be connected to each other in a sealing way but also protect other structures when the terminal 1 is stamped so as to prevent the other structures from being damaged, which improves a yield rate of the riveted battery cover.

In an embodiment, as shown in FIG. 2, the top cover 4 is provided with a first connecting hole 40 for the terminal 1 to pass through: the upper plastic insulator 3 is provided with a second connecting hole 301 directly facing the first connecting hole 40; and the bottom insulator 5 is provided with a third connecting hole 50 directly facing the second connecting hole 301. As shown in FIGS. 1 to 3, a ring-shaped protrusion 31 is disposed on a periphery of the second connecting hole 301, the ring-shaped protrusion 31 extends into the first connecting hole 40 and abuts the sealing ring 62, and the stamped end of the terminal 1 successively passes through the third connecting hole 50, the first connecting hole 40, the second connecting hole 301, the first step hole 201, and the second step hole 202.

In order to facilitate placement of the riveting block 2 on the upper plastic insulator 3, in this embodiment, as shown in FIG. 2, a placing groove 302 is defined on the upper plastic insulator 3 and the riveting block 2 is located in the placing groove 302.

As shown in FIG. 2, the riveting block 2 is provided with a counterbore 203 coaxially distributed with the second step hole 202 and an upper end of the protrusion 11 is located in the second step hole 202. In other embodiments, the upper end of the protrusion 11 is located in the counterbore 203 and/or the second stepped hole 202. For example, after the riveting block 2 is welded to the protrusion 11, the upper end of the protrusion 11 may also be located in the counterbore 203 or a part of the upper end of the protrusion 11 is located in the counterbore 203 while another part of the upper end of the protrusion 11 is located in the second stepped hole 202. Thus, it is ensured that the protrusion 11 does not protrude from a surface of the riveting block 2, reducing the probability of causing cold joints between the protrusion 11 and the riveting block 2. In this embodiment, a diameter of the counterbore 203 is larger than a diameter of the second step hole 202, which makes it easier for a riveted stamping head to stamp the stamped end of the terminal 1 downward. In this manner, the upper end of the protrusion 11 is recessed on the riveting block 2.

As shown in FIG. 2, the terminal 1 is provided with a step 10 and the step 10 is attached to a lower-end surface of the riveting block 2. After the riveted stamping head stamps the terminal 1 downward to form the protrusion 11, a part of the riveting block 2 is clamped between the step 10 and the protrusion 11, limiting the possibility of the terminal 1 moving around the own axis of the terminal 1.

Operation steps of assembling the terminal 1 are as follows: the stamped end of the terminal 1 successively passes through the bottom insulator 5, the top cover 4, the upper plastic insulator 3, the first step hole 201, and the second step hole 202: the bottom of the terminal 1 is secured and the riveting block 2 is pressed to compress the sealing member 6 to a necessary compressing level: the riveted stamping head stamps the stamped end of the terminal 1 downward to make materials at the stamped end of the terminal 1 flow to form the protrusion 11; and the protrusion 11 and the riveting block 2 are securely connected by laser welding.

In an embodiment, two terminals 1 are provided, one of the two terminals 1 is a positive terminal and the other one of the two terminals 1 is a negative terminal: one top cover 4 and one bottom insulator 5 are provided, two first connecting holes 40 are provided on the top cover 4 and two third connecting holes 50 are provided on the bottom insulator 5; and two riveting blocks 2, two upper plastic insulators 3 and two sealing members 6 are provided. Moreover, the positive terminal is arranged to correspond to one of the two first connecting holes 40, one of the two third connecting holes 50, one of the two riveting blocks 2, one of the two upper plastic insulators 3 and one of the two sealing members 6 while the negative terminal is arranged to correspond to the other one of the two first connecting holes 40, the other one of the two third connecting holes 50, the other one of the two riveting blocks 2, the other one of the two upper plastic insulators 3, and the other one of the two sealing members 6. The assembling process is as mentioned above.

It should be understood by those skilled in the art that the present application is not limited to the embodiments described herein. Those skilled in the art can make various changes, adaptations, and substitutions.

What is claimed is:

1. A riveted battery cover, comprising a terminal and comprising a riveting block, an upper plastic insulator, a top cover and a bottom insulator successively stacked; wherein a first step hole, a second step hole, and a counterbore are coaxially disposed in the riveting block, the second step hole being disposed between the first step hole and the counterbore, a diameter of the second step hole being larger than a diameter of the first step hole, and a diameter of the counterbore being larger than the diameter of the second step hole; the counterbore opening to an upper surface of the riveting block; a stamped end of the terminal successively passes through the bottom insulator, the top cover, the upper plastic insulator, the first step hole and the second step hole;

and a part of the stamped end of the terminal protruding from the first step hole is stamped to form a protrusion, the protrusion being located in the second step hole, wherein an upper end of the protrusion is located in at least one of the counterbore or the second step hole.

2. The riveted battery cover according to claim 1, wherein the protrusion is welded on the riveting block and an upper end of the terminal is recessed on the riveting block.

3. The riveted battery cover according to claim 1, wherein a sealing member is sleeved on the terminal and the sealing member is clamped between the top cover and a securing end of the terminal.

4. The riveted battery cover according to claim 3, wherein the sealing member is sleeved on the terminal and the sealing member comprises a sealing gasket and a sealing ring; a lower-end surface of the sealing gasket and an inner wall of the sealing ring are each attached to the terminal; an upper-end surface of the sealing gasket is attached to the top cover); and a top of the sealing ring abuts the upper plastic insulator.

5. The riveted battery cover according to claim 4, wherein the top cover is provided with a first connecting hole for the terminal to pass through; the upper plastic insulator is provided with a second connecting hole directly facing the first connecting hole; a ring-shaped protrusion is disposed on a periphery of the second connecting hole; and the ring-shaped protrusion extends into the first connecting hole and abuts the sealing ring.

6. The riveted battery cover according to claim 1, wherein a placing groove is defined on the upper plastic insulator and the riveting block is located in the placing groove.

7. The riveted battery cover according to claim 1, wherein the terminal is provided with a step and the step is attached to a lower-end surface of the riveting block.

8. The riveted battery cover according to claim 1, wherein the riveting block is a riveted aluminum block.

9. The riveted battery cover according to claim 2, wherein a placing groove is defined on the upper plastic insulator and the riveting block is located in the placing groove.

10. The riveted battery cover according to claim 3, wherein a placing groove is defined on the upper plastic insulator and the riveting block is located in the placing groove.

11. The riveted battery cover according to claim 4, wherein a placing groove is defined on the upper plastic insulator and the riveting block is located in the placing groove.

12. The riveted battery cover according to claim 5, wherein a placing groove is defined on the upper plastic insulator and the riveting block is located in the placing groove.

* * * * *